United States Patent
Stevenson et al.

(10) Patent No.: US 10,471,644 B2
(45) Date of Patent: Nov. 12, 2019

(54) BLOW MOLDING APPARATUS

(71) Applicant: Weiler Engineering, Inc., Elgin, IL (US)

(72) Inventors: Mark D. Stevenson, Lombard, IL (US); Joseph Immordino, Itasca, IL (US)

(73) Assignee: Weiler Engineering, Inc., Elgin, IL (US)

( * ) Notice: Subject to any disclaimer, the term of this patent is extended or adjusted under 35 U.S.C. 154(b) by 64 days.

(21) Appl. No.: 15/824,571

(22) Filed: Nov. 28, 2017

(65) Prior Publication Data

US 2019/0160723 A1    May 30, 2019

(51) Int. Cl.
| | |
|---|---|
| *B29C 49/32* | (2006.01) |
| *B29C 49/58* | (2006.01) |
| *B29C 49/78* | (2006.01) |
| *B29C 49/28* | (2006.01) |

(52) U.S. Cl.
CPC .............. *B29C 49/32* (2013.01); *B29C 49/58* (2013.01); *B29C 49/78* (2013.01); *B29C 49/28* (2013.01)

(58) Field of Classification Search
CPC .. B29C 49/32; B29C 49/4236; B29C 49/4273
See application file for complete search history.

(56) References Cited

U.S. PATENT DOCUMENTS

| | | | | |
|---|---|---|---|---|
| 3,743,466 A | * | 7/1973 | Gampe | B29C 49/32 425/451 |
| 4,707,966 A | * | 11/1987 | Weiler | B29C 65/56 264/524 |
| 5,478,229 A | * | 12/1995 | Kato | B29C 49/32 264/532 |
| 6,514,452 B1 | * | 2/2003 | Maier | B29C 49/32 264/542 |
| 2008/0029936 A1 | * | 2/2008 | Mehnert | B29C 49/04 264/523 |

* cited by examiner

*Primary Examiner* — Robert B Davis
(74) *Attorney, Agent, or Firm* — Olson & Cepuritis, Ltd.

(57) ABSTRACT

A blow molding apparatus is provided with a mold carriage movable in a path between an extruder station and a blow-and-fill station. The mold carriage can have one or more mold assemblies. Each mold assembly has opposed first and second mold halves that together define a mold cavity. The first mold half is fixed to the mold carriage while the second mold half is independently movable relative to the first mold half within the mold carriage to open and close the mold assembly.

7 Claims, 4 Drawing Sheets

BLOW MOLDING APPARATUS

FIELD OF INVENTION

This invention relates to extrusion blow molding apparatus. More particularly, this invention relates to extrusion blow molding apparatus for fabricating containers by a blow/fill/seal method.

BACKGROUND OF INVENTION

Blow/fill/seal blow molding process is an extrusion blow molding process. The basic blow molding apparatus includes an extruder, a die with single or multiple parison, a clamping arrangement, and a mold. The basic blow/fill/seal extrusion blow molding process steps are extrusion of a parison, inflation of the extruded parison while in a mold to form a container, filling and sealing of the formed container, and removal of the sealed container from the mold in a single, sequential operation. The blow/fill/seal process is a preferred process for aseptic packaging of liquid pharmaceutical products. A typical blow/fill/seal machine and process is described in U.S. Pat. Nos. 3,597,793, 4,176,153, and 4,707,966 to Weiler et al.

Apparatus for extrusion blow molding has a parison forming station, a blow molding station, and a container take-out station downstream from the blow molding station. In blow/fill/seal blow molding process the parison extruded at the parison forming station is received in the mold at the parison forming station, the mold holding the parison is transported to the blow-and-fill station where the parison is transformed into a container which is then filled and sealed. The sealed container, while still in the mold, is then transported to the take-out station. A take-out conveyor receives the formed and filled container when the mold is opened at the take-out station and transports the container away from the blow molding apparatus for secondary operations such as flash trimming, if needed, and packaging.

The present blow molding apparatus facilitates a more efficient blow/fill/and seal operation at the blow-and-fill station by providing a mold carriage and at least one mold assembly associated therewith in which only a portion of the mold assembly is actuated during the blow molding process, resulting in reduced processing time.

SUMMARY OF INVENTION

A blow molding apparatus includes a mold carriage movable in a path between an extruder station and a blow-and-fill station. The mold carriage is provided with at least one mold assembly having opposed first and second mold halves which together define a mold cavity. The first mold half is fixed to the mold carriage, and the second mold half is independently movable within the mold carriage relative to the first mold half along the path to open and close the mold assembly.

A closed loop position control for the mold carriage and the mold assembly, or mold assemblies, is provided by a servo controller operably associated with the blow molding apparatus. Feedback loops are provided to the controller by position sensors.

DESCRIPTION OF PREFERRED EMBODIMENTS

Figure 1:
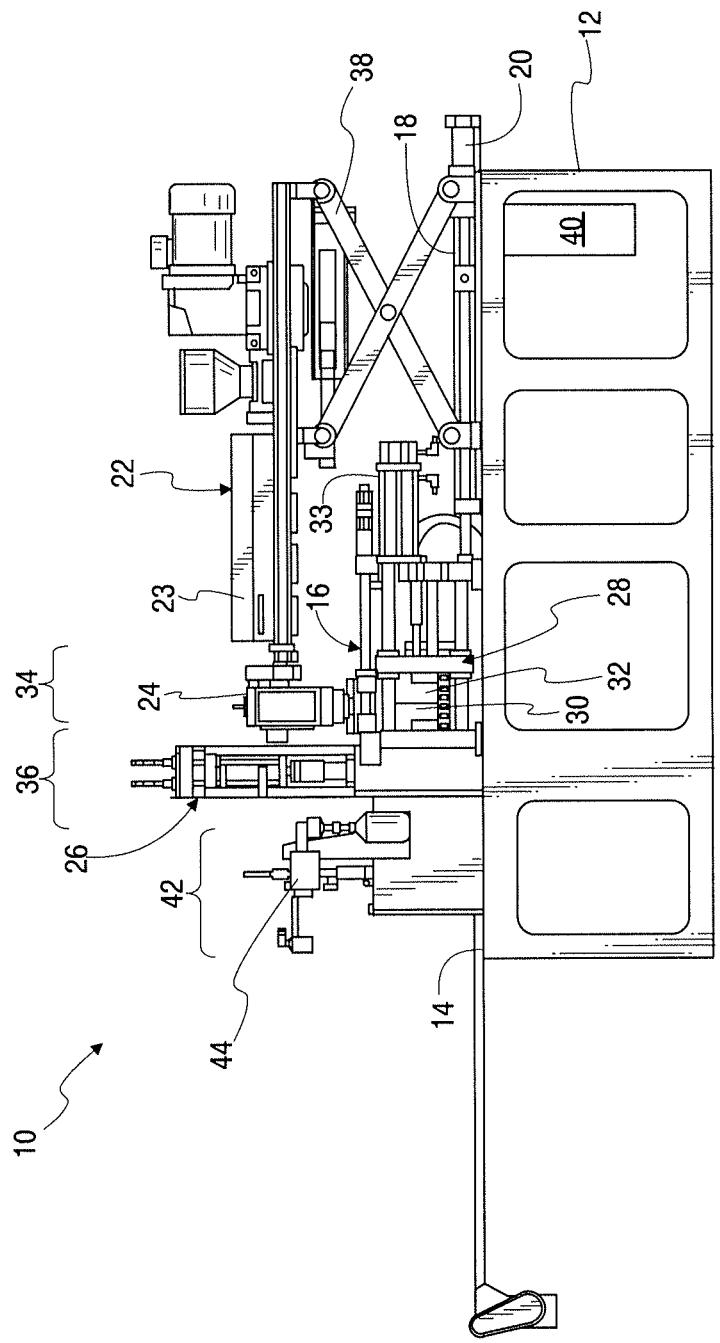
FIG. 1 is a side elevation of a blow molding apparatus embodying the invention and provided with a single mold assembly.

Referring to the drawings, FIG. 1 shows blow molding apparatus 10 equipped with a single mold assembly 28 in mold carriage 16 which is slidably mounted to horizontal base 14 of frame 12. Mold assembly 28 includes coacting first mold half 30 and second mold half 32 which mold halves together define a mold cavity within the mold assembly. First mold half 30 is fixed to mold carriage 16. Second mold half 32, on the other hand, is slidably mounted to mold carriage 16 and is movable toward and away from first mold half 30 along mold carriage 16 by mold actuator 33 to open or close mold assembly 28.

Mold carriage 16 itself is movable in a path between extruder station 34 and blow-and-fill station 36 by mold carriage positioning drive 18 in response to urging by mold carriage actuator 20. The path can be linear or curvilinear, as desired.

Extruder 22 having extruder barrel 23 in communication with extruder die head 24 is provided at extruder station 34. As can be seen in FIG. 1, extruder die head 24 is situated above mold assembly 28 so that a parison segment from extruder die head 24 can be received directly within the mold cavity defined by mold assembly 28. Extruder 22 is mounted for vertical reciprocal movement on lift 38 so as to provide necessary clearance for extruder die head 24 as mold carriage 16 is shuttled between extruder station 34 and adjacent blow-and-fill station 36.

Blow-and-fill station 36 includes blow-and-fill head 26 and a mandrel (not shown) for expanding the severed parison segment prior to filling.

Container take-out station 42 is provided downstream from blow-and-fill station 36 and includes take-out conveyor 44 for removing filled containers from open mold assembly 28.

Controller 40 is operably associated with the respective actuators and drives as well as coordinates mold assembly operation and positioning relative to parison extrusion, container blowing and filling, as well as filled container take-out.

Figure 2:
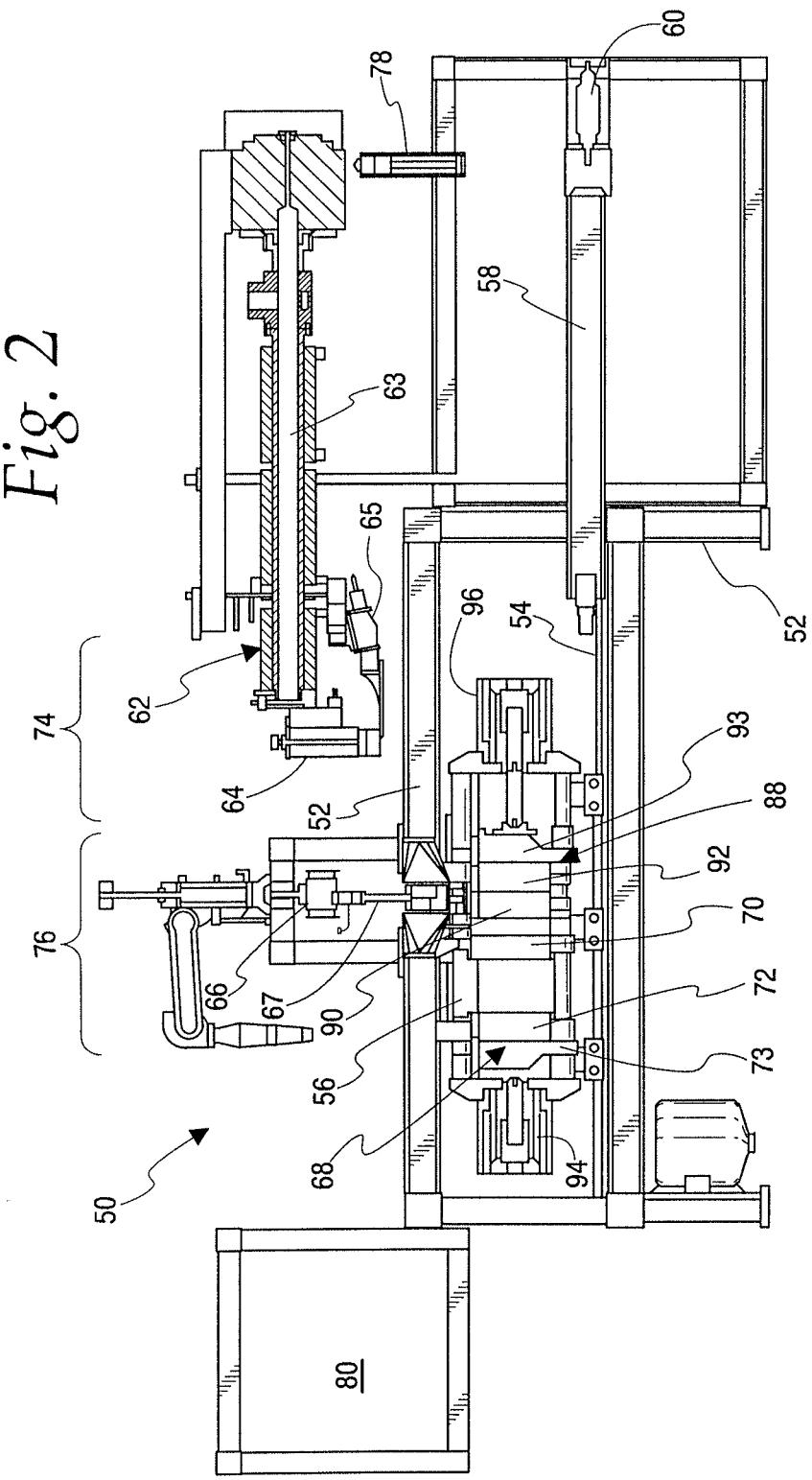
FIG. 2 is a side elevation of a blow molding apparatus embodying the invention and provided with two side-by-side mold assemblies on the same mold carriage.

A blow molding apparatus equipped with dual mold assemblies served by a single extruder is illustrated in FIG. 2. In this particular embodiment, blow molding apparatus 50 is provided with mold carriage 56 slidably mounted to horizontal base 54 of supporting frame 52. Two mold assemblies leading mold assembly 68 and trailing mold assembly 88 are situated in mold carriage 56. Leading mold assembly 68 includes first mold half 70 which is fixed to mold carriage 56 and movable mold half 72 which is attached to mold platen 73 and movable relative to the fixed first mold half 70 within mold carriage 56. Mold halves 70 and 72 coact to define a mold cavity of leading mold assembly 68.

Similarly, trailing mold assembly 88 includes fixed mold half 90 and movable mold half 92 which is carried by mold platen 93 and is movable relative to fixed mold half 90. Fixed mold half 90 is attached to mold carriage 56 and situated adjacent to fixed mold half 70.

Mold actuator 94 is operably associated with leading mold assembly 68 and mold actuator 96 is operably associated with trailing mold assembly 88. Operation of mold actuators 94 and 96 is governed by controller 80 carried by frame 52.

Molding apparatus 50 includes extruder station 74 on frame 52 and blow-fill station 76 downstream from extruder station 74.

Extruder station 74 includes extruder 62, extruder barrel 63 and extruder die head 64 in flow communication with extruder barrel 63, and parison cut-off device 65. Extruder lift 78 provides vertical height adjustment and necessary clearance for extruder die head 64 when a parison segment is extruded between open mold halves positioned under extruder die head 64. The extruder lift can be a lift, an air cylinder, a hydraulic cylinder, and the like.

Mold carriage actuator 60 is operably associated with mold carriage positioning drive 58 for mold carriage 56 which is slidably mounted to horizontal base 54. Mold carriage actuator 60 positions leading mold assembly 68 and trailing mold assembly 88 sequentially under extruder die head 64 to receive between respective open mold halves an extruded parison segment.

Blow-fill station 76 includes blow-fill head 66 and mandrel 67. After a parison segment is received between mold halves at the extruder station and severed, and the mold halves closed about the severed parison segment by the corresponding mold actuator, the parison bearing mold assembly is positioned under mandrel 67 at blow-fill station 76. Mandrel 67 then enters the open end parison segment, the parison is expanded using compressed sterile gas, with or without vacuum assist, to conform to the contours of the mold cavity defined by the closed mold halves, and thereafter the expanded parison is filled with the desired contents. The resulting filled container is then sealed using conventional sealing molds (not shown) situated above the main mold assembly. Thereafter, the mold assembly is moved further downstream to a container take-out station (not shown).

Figure 3:
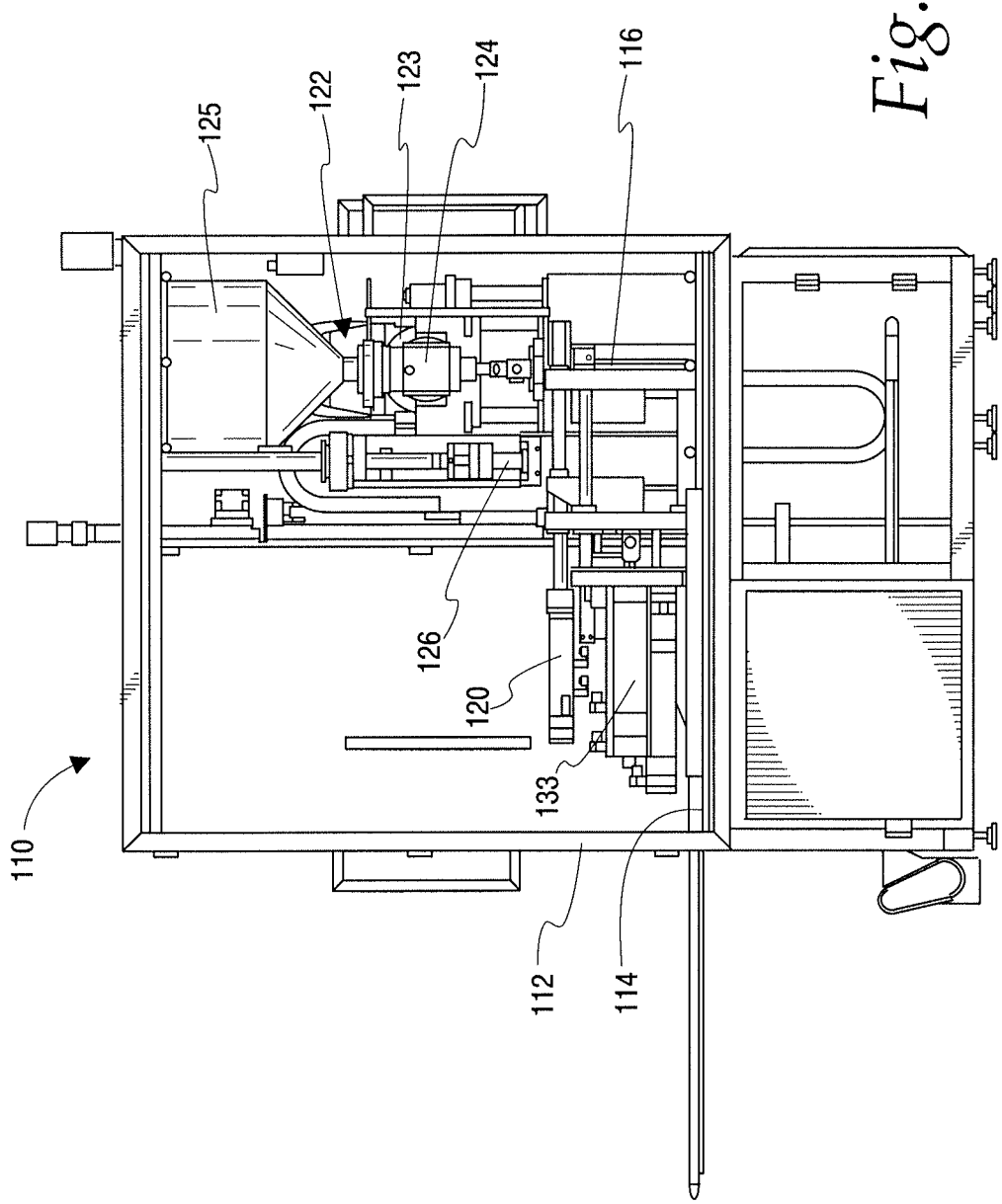
FIG. 3 is a side elevation of a blow molding apparatus similar to that shown in FIG. 1 but having extruder situated substantially at a right angle relative to the path of mold carriage movement.
Figure 4:
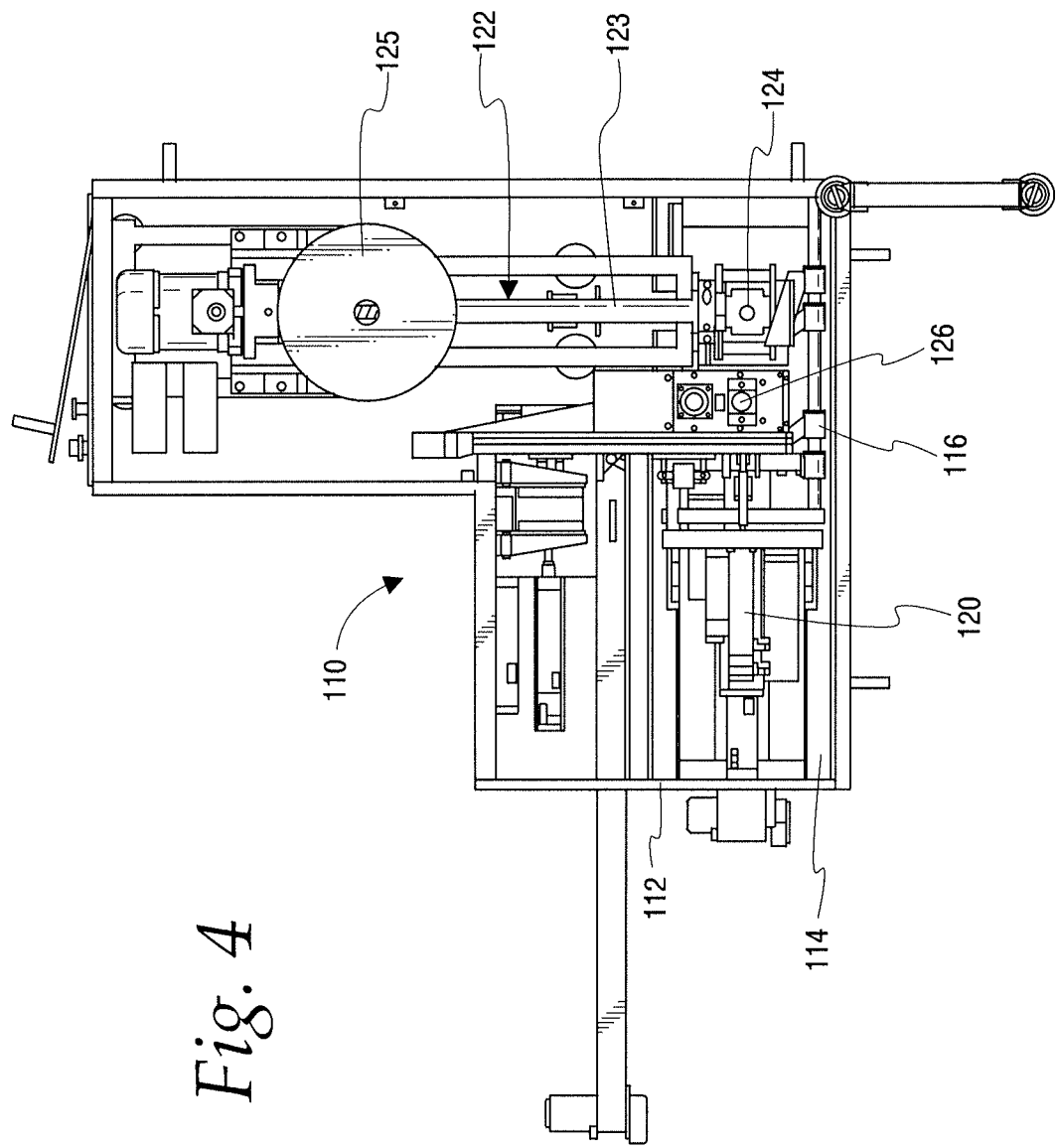
FIG. 4 is a plan view of the blow molding apparatus shown in FIG. 3.

Referring to FIGS. 3 and 4, blow molding apparatus 110 on frame 112 is provided with extruder 122, comprising extruder feed hopper 125, extruder barrel 123, and extruder die head 124 operably associated with extruder barrel 123. The extruder barrel is positioned at substantially a right angle relative to the path of mold carriage 116 which is slidably mounted to horizontal base 114 of frame 112.

Blow-and-fill head 126 is situated on frame 112 adjacent to extruder die head 124 and in the path of mold carriage 116 which shuttles a mold assembly (not shown) in mold carriage 116 to positions first under extruder die head 124 to receive an extruded parison segment and thereafter under blow-and-fill head 126 to form and fill the formed container. Mold carriage 116 is positioned by mold carriage actuator 120, a servo drive or a hydraulic drive, preferably a servo drive.

The foregoing specification and the drawings are intended as illustrative and are not to be taken as limiting. Still other variations and rearrangements of parts within the spirit and scope of the present invention are possible and will readily present themselves to one skilled in the art.

The invention claimed is:

1. A blow molding apparatus comprising
a frame including a horizontal base;
a mold carriage slidably mounted to the base for movement in a path between an extruder station and a blow-and-fill station;
a mold carriage actuator operably associated with the mold carriage;
at least one mold assembly in the mold carriage and comprising opposed first and second mold halves which together define a mold cavity, the second mold half being independently movable relative to the first mold half along said path to open and close the mold assembly, and the first mold half being fixed to the mold carriage;
a mold actuator operably associated with the mold assembly for opening and closing the mold assembly;
an extruder die head at the extruder station, mounted to the frame for vertical reciprocal movement relative to the base;
a blow-and-fill head mounted to the frame above the blow-and-fill station; and
a controller operably associated with the mold carriage actuator for positioning said mold assembly at the extruder station and the blow-and-fill station.

2. The blow molding apparatus in accordance with claim 1 and having two adjacent but independently actuatable mold assemblies in the mold carriage.

3. The blow molding apparatus in accordance with claim 1 wherein the extruder die head is in communication with an extruder barrel situated along the path of the mold carriage.

4. The blow molding apparatus in accordance with claim 1 wherein the extruder head is in communication with an extruder barrel situated at substantially a right angle relative to the path of the mold carriage.

5. A blow molding apparatus comprising
a supporting frame including a horizontal base;
a mold carriage assembly mounted to the base and movable in a path between an extruder station and a blow-fill station;
a mold carriage positioning drive operably associated with the mold carriage;
first and second adjacent mold assemblies in the mold carriage, each mold assembly comprising opposed mold halves together defining a mold cavity and being independently actuatable to open and close the mold cavity along said path;
a mold actuator operably associated with each mold assembly for opening and closing the mold cavity;
an extruder die head mounted to the frame above the extruder station for vertical reciprocal movement;
a blow-and-fill head mounted to the frame above the blow-and-fill station; and
a controller operably associated with the mold carriage positioning drive for positioning the mold assemblies at the extruder station and the blow-and-fill station;
each said mold assembly comprising a fixed mold half and a mold half movable along said path.

6. The blow molding apparatus in accordance with claim 5 wherein the mold carriage positioning drive is a servo drive.

7. The blow molding apparatus in accordance with claim 5 wherein the mold carriage positioning drive is a hydraulic drive.

* * * * *